United States Patent
Sahnoune et al.

(10) Patent No.: US 6,713,520 B2
(45) Date of Patent: Mar. 30, 2004

(54) FOAMS AND METHODS FOR MAKING THE SAME

(75) Inventors: Abdelhadi Sahnoune, Akron, OH (US); Terry M. Finerman, Rochester, MI (US)

(73) Assignee: Advanced Elastomer Systems, L.P., Akron, OH (US)

( * ) Notice: Subject to any disclaimer, the term of this patent is extended or adjusted under 35 U.S.C. 154(b) by 38 days.

(21) Appl. No.: 10/174,656

(22) Filed: Jun. 19, 2002

(65) Prior Publication Data

US 2004/0001942 A1 Jan. 1, 2004

(51) Int. Cl.⁷ .............. C08L 9/00; C08L 23/00; C08L 27/12; C08L 33/00; C08F 8/00
(52) U.S. Cl. .............. 521/53; 521/54; 521/55; 525/191; 525/192; 525/194; 525/199; 525/205; 525/214; 525/216; 525/222; 525/232; 525/240; 525/241; 525/243
(58) Field of Search .............. 521/53, 54, 55; 525/191, 192, 194, 199, 205, 214, 216, 222, 232, 240, 241, 243

(56) References Cited

U.S. PATENT DOCUMENTS 6,433,090 B1 * 8/2002 Ellul et al. .................. 525/191

FOREIGN PATENT DOCUMENTS

WO      WO 200121705 A1 * 3/2001

* cited by examiner

*Primary Examiner*—Nathan M. Nutter
(74) *Attorney, Agent, or Firm*—Arthur M. Reginelli; William A. Skinner

(57) ABSTRACT

A foam profile prepared by a process comprising the steps of foaming a thermoplastic vulcanizate, where the thermoplastic vulcanizate is prepared by a process comprising the step of dynamically vulcanizing a rubber within a mixture that includes from about 15 to about 95 percent by weight of the rubber and from about 5 to about 85 percent by weight of a thermoplastic component based upon the total weight the rubber and thermoplastic component combined, where the thermoplastic component includes from about 65 to about 90 percent by weight of a conventional thermoplastic resin and from about 10 to about 35 percent by weight of a random propylene copolymer based upon the total weight of the thermoplastic component.

20 Claims, No Drawings

FOAMS AND METHODS FOR MAKING THE SAME

TECHNICAL FIELD

This invention is directed toward foams and methods for making foams from thermoplastic vulcanizates.

BACKGROUND OF THE INVENTION

Thermoplastic elastomers are known. They have many of the properties of thermoset elastomers, yet they are processable as thermoplastics. One type of thermoplastic elastomer is a thermoplastic vulcanizate, which may be characterized by finely-divided rubber particles dispersed within a plastic. These rubber particles are crosslinked to promote elasticity. Thermoplastic vulcanizates are conventionally produced by dynamic vulcanization, which is a process whereby a rubber is cured or vulcanized within a blend with at least one non-vulcanizing polymer while the polymers are undergoing mixing or masticating at some elevated temperature, preferably above the melt temperature of the non-vulcanizing polymer.

Some thermoplastic vulcanizates have been foamed to form cellular products. The ability to foam a thermoplastic vulcanizate is dependent upon the amount of plastic within the composition. For example, when employing conventional thermoplastic vulcanizates, about 40 parts of plastic per 100 parts of rubber is required to produce a technologically useful foam.

The ability to produce soft foams, however, is hindered by the amount of plastic that is required. In other words, while a minimum amount of plastic is required to achieve a foam, the hardness of the foam is directly related to the amount of plastic. For example, where 42 parts of plastic are used per 100 parts of rubber, the thermoplastic vulcanizate has a Shore A Hardness (ASTM 2240) of about 68. The resultant foam may be undesirable for many applications because of high hardness, which translates into high compression set and high compression load deflection.

SUMMARY OF INVENTION

In general the present invention provides a foam profile prepared by a process comprising the steps of foaming a thermoplastic vulcanizate, where the thermoplastic vulcanizate is prepared by a process comprising the step of dynamically vulcanizing a rubber within a mixture that includes from about 15 to about 95 percent by weight of the rubber and from about 5 to about 85 percent by weight of a thermoplastic component based upon the total weight the rubber and thermoplastic component combined, where the thermoplastic component includes from about 65 to about 90 percent by weight of a conventional thermoplastic resin and from about 10 to about 35 percent by weight of a random propylene copolymer based upon the total weight of the thermoplastic component.

The present invention also includes a foam profile prepared by a process comprising the steps of foaming a thermoplastic vulcanizate, where the thermoplastic vulcanizate comprises vulcanized rubber and from about 5 to about 85 percent by weight of a thermoplastic component based upon the total weight of the rubber and thermoplastic component combined, and where the thermoplastic component comprises from about 65 to about 90 percent by weight of a conventional thermoplastic resin and from about 10 to about 35 percent by weight of a random propylene copolymer based upon the total weight of the thermoplastic component.

The present invention further includes foam profile comprising a foamed thermoplastic vulcanizate, where the thermoplastic vulcanizate comprises vulcanized rubber and from about 5 to about 85 percent by weight of a thermoplastic component based upon the total weight of the rubber and thermoplastic component combined, and where the thermoplastic component comprises from about 65 to about 90 percent by weight of a conventional thermoplastic resin and from about 10 to about 35 percent by weight of a random propylene copolymer based upon the total weight of the thermoplastic component.

It has surprisingly been discovered that thermoplastic vulcanizates that contain a certain amount of random propylene copolymer can be used to make foams that do not suffer from many of the problems associated with prior art foams produced from thermoplastic vulcanizates. Notably, even though the thermoplastic vulcanizates employed in this invention have a Shore A hardness (ASTM 2250) of about 50 to about 60, the thermoplastic vulcanizates can be foamed to produce technologically useful foams that have advantageously low compression set and advantageously low compression load deflection.

PREFERRED EMBODIMENT FOR CARRYING OUT THE INVENTION

The thermoplastic vulcanizates employed to make foams according to this invention include at least one cured rubber, at least one random propylene copolymer, and at least one conventional thermoplastic resin. These thermoplastic vulcanizates are foamed by employing a foaming agent.

Any rubber or mixture thereof that is capable of being crosslinked or cured can be used as the rubber component. Reference to a rubber may include mixtures of more than one rubber. Useful rubbers typically contain some degree of unsaturation in their polymeric main chain. Some non-limiting examples of these rubbers include elastomeric copolymers, butyl rubber, natural rubber, styrene-butadiene copolymer rubber, butadiene rubber, acrylonitrile rubber, halogenated rubber such as brominated and chlorinated isobutylene-isoprene copolymer rubber, butadiene-styrene-vinyl pyridine rubber, urethane rubber, polyisoprene rubber, epichlolorohydrin terpolymer rubber, and polychloroprene. The preferred rubbers are elastomeric copolymers and butyl rubber.

The term elastomeric copolymer refers to rubbery copolymers polymerized from ethylene, at least one α-olefin monomer, and optionally at least one diene monomer. The α-olefins may include, but arc not limited to, propylene, 1-butene, 1-hexene, 4-methyl-1 pentene, 1-octene, 1-decene, or combinations thereof. The preferred α-olefins are propylene, 1-hexene, 1-octene or cornbination. thereof. The diene monomers may include; but are not limited to, 5-ethylidene-2-norbornene; 1,4-hexadiene; 5-methylene-2-norbornene; 1,6-octadiene; 5-methyl-1,4-hexadiene; 3,7-dimethyl- 1,6-octadiene; 1,3-cyclopentadiene; 1,4-cyclohexadiene; dicyclopentadiene; 5-vinyl-2-norbornene and the like, or a combination thereof. The preferred diene monomers are 5-ethylidene-2-norbornene and 5-vinyl-2-norbornene. In the event that the copolymer is prepared from ethylene, α-olefin, and diene monomers, the copolymer may be referred to as a terpolymer or even a tetrapolymer in the event that multiple α-olefins or dienes are used.

Elastomeric copolymers are commercially available under the tradenames Vistalon™ (Exxon Mobil Chemical Co.; Houston, Tex.), Keltan™ (DSM Copolymers; Baton Rouge, La.), Nordel™ IP (DuPont Dow Elastomers;

Wilmington, Del.), ElastoFlo™ (Union Carbide; Danbury, Conn.), and Buna™ (Bayer Corp.; Germany).

In one embodiment, the elastomeric copolymer is a terpolymer of ethylene, at least one α-olefin monomer, and 5-vinyl-2-norbornene. This terpolymer is advantageous when a peroxide curative is employed as described in U.S. Pat. No. 5,656,693, which is incorporated herein by reference. This terpolymer is also advantageous when a silicon-containing curative is employed in the presence of platinum-containing catalyst as described in International Publication No. WO 98/38226, which is incorporated by reference. The terpolymer preferably includes from about 40 to about 90 mole percent of its polymeric units deriving from ethylene, and from about 0.2 to about 5 mole percent of its polymeric units deriving from vinyl norbornene, based on the total moles of the terpolymer, with the balance comprising units deriving from α-olefin monomer.

The term butyl rubber refers to rubbery amorphous copolymers of isobutylene and isoprene or an amorphous terpolymer of isobutylene, isoprene, and a divinyl aromatic monomer. These copolymers and terpolymers should preferably contain from about 0.5 to about 10 percent by weight, or more preferably from about 1 to about 4 percent by weight, isoprene. The term butyl rubber also includes copolymers and terpolymers that are halogenated with from about 0.1 to about 10 weight percent, or preferably from about 0.5 to about 3.0 weight percent, chlorine or bromine. This chlorinated copolymer is commonly called chlorinated butyl rubber. While butyl rubber is satisfactory for the practice of this invention, halogen-free butyl rubber containing from about 0.6 to about 3.0 percent unsaturation is preferred, with butyl rubber having a polydispersity of about 2.5 or below being especially preferred. Butyl rubbers are commercially prepared by polymerization at low temperature in the presence of a Friedel-Crafts catalyst as disclosed within U.S. Pat. Nos. 2,356,128 and 2,944,576. Butyl rubber is commercially available from a number of sources as disclosed in the Rubber World Blue Book. For example, butyl rubber is available under the tradename Polysar Butyl™ (Bayer; Germany) or the tradename Exxon Butyl™ (Exxon Chemical Co.).

Exemplary conventional thermoplastic resins include crystallizable polyolefins, polyimides, polyesters (nylons), and fluorine-containing thermoplastics. Also, the thermoplastic resins may include copolymers of polyolefins with styrene such as styrene-ethylene copolymer. The preferred thermoplastic resins are crystallizable polyolefins that are formed by polymerizing α-olefins such as ethylene, propylene, 1-butene, 1-hexene, 1-octene, 2-methyl-1-propene, 3-methyl-pentene, 4-methyl-1-pentene, 5-methyl-1-hexene, and mixtures thereof. Copolymers of ethylene and propylene or ethylene or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof is also contemplated. These homopolymers and copolymers may be synthesized by using any polymerization technique known in the art such as, but not limited to, the "Phillips catalyzed reactions," conventional Ziegler-Natta type polymerizations, and metallocene catalysis including, but not limited to, metallocene-alumoxane and metallocene-ionic activator catalysis.

Conventional thermoplastic resins preferably have a weight average molecular weight from about 200,000 to about 600,000, and a number average molecular weight from about 80,000 to about 200,000. More preferably, these resins have a weight average molecular weight from about 300,000 to about 500,000, and a number average molecular weight from about 90,000 to about 150,000.

Useful conventional thermoplastic resins preferably have a melt temperature ($T_m$) that is from about 150 to about 175° C., preferably from about 155 to about 170° C., and even more preferably from about 160 to about 170° C. The glass transition temperature ($T_g$) of these resins is from about −5 to about 10° C., and preferably from about −3 to about 5° C. The crystallization temperature ($T_c$) of these resins is from about 95 to about 135° C., and preferably from about 100 to about 120° C. as measured by DSC at 10° C./min. They also preferably have a melt flow rate that is less than about 10 dg/min, preferably less than about 2 dg/min, and still more preferably less than about 1.0 dg/min per ASTM D-1238.

An especially preferred thermoplastic resin is a linear high crystallinity isostatic or syndiotactic polypropylene. This polypropylene generally has a density of from about 0.85 to about 0.91 g/cc, with the largely isotactic polypropylene having a density of from about 0.90 to about 0.91 g/cc. Also, high and ultra-high molecular weight polypropylene that has a fractional melt flow rate is highly preferred.

The random propylene copolymers are copolymers of propylene and at least one other comonomer, where the comonomer has a statistical distribution throughout the polymer. These random propylene copolymers are known in the art as described in WO 00/69964 and WO 00/69963, and thermoplastic vulcanizates prepared with these copolymers are described in U.S. Pat. No. 6,288,171 B2, which is incorporated herein by reference.

Useful comonomers include ethylene and α-olefins having from 4 to about 20 carbon atoms and preferably from 4 to 8 carbon atoms. Exemplary α-olefins include 1-butene, 1-hexene, 1-octene, 2-methyl-1-propene, 3-methyl-1-pentene, 4-methyl-1-pentene, 5-methyl-1-hexene, and mixtures thereof.

The random propylene copolymers employed in this invention include from about 7 to about 22 percent by weight polymeric units deriving from the comonomer with the balance comprising units deriving from propylene monomer. Preferably, the random propylene copolymer includes from about 9 to about 20 percent by weight, and even more preferably from about 11 to about 18 percent by weight, polymeric units deriving from the comonomer with the balance comprising units deriving from propylene monomer.

The random propylene copolymers have a weight average molecular weight ($M_w$) from about 5,000 to about 1,000,000, preferably from about 100,000 to about 900,000, and more preferably from about 150,000 to about 800,000. The molecular weights provided within this specification refer to $M_w$ as determined by Gel Permeation Chromatography (GPC) with both polystyrene and low molecular weight polyethylene standards. The random propylene copolymers preferably have a narrow molecular weight distribution (MWD), which is preferably from about 1.5 and about 5.0, more preferably from about 1.7 to about 4.5, and even more preferably from about 1.9 to about 3.2.

The random propylene copolymers may range from amorphous polymers to highly crystalline polymers, including semi-crystalline polymers. Their melt temperature should generally be lower than the decomposition temperature of the rubber. The random propylene copolymer preferably has a single melting point as determined by differential scanning calorimetry (DSC). Preferably, the melt temperature ($T_m$) is from about 20° to about 100° C., more preferably from about 30° to about 90° C., and even more preferably from about 40° to about 85° C. Their glass transition temperature ($T_g$) is preferably from about −5 to about −40° C., more preferably from about −10° to about −35° C., and even more preferably from about −15° to about −30° C. The crystallization temperature ($T_c$) should preferably be from about 10° to about 60° C., more preferably from about 15° to about 55° C., and even more preferably from about 20° to about 50° C.

The random propylene copolymer preferably have a narrow compositional distribution. The composition distribution of the copolymer can be determined by thermal fractionation in a solvent such as hexane or heptane. Typically, approximately 75 percent by weight and more preferably 85 percent by weight of the polymer is isolated as a one or two adjacent, soluble fraction with the balance of the polymer in immediately preceding or succeeding fractions. Each of these fractions has a composition (weight percent ethylene content) with a difference of no greater than 20 weight percent (relative) of the average weight percent ethylene content of the random propylene copolymer component. The random propylene copolymer is narrow in compositional distribution if it meets the fractionation test outlined above.

Also, the compositional distribution of these elastomeric polymers of this invention, as based upon the closest 90 percent of fractionated samples of a given polymer, should not vary by more than 4 percent, preferably by not more than 3 percent, more preferably by not more than 2 percent, and most preferably by not more than 1 percent. In other words, when fractions of a polymer sample are analyzed, the amount of ethylene within each fraction should not vary by more than 4 percent, or as the preferred range may be, for the closest 90 percent of the fractionated samples.

Analytically, the ethylene compositional distribution of a polymer sample may be determined by the following exemplary method. Five grams of a polymer is dissolved within 500 ml of hexane or cyclohexane at room temperature. The insoluble portion is filtered out and dried by pouring the entire solution through a 150 mesh stainless steel screen. To the soluble portion, i.e., supernatant solution, is added 2-propanol dropwise until the solution becomes turbid. Approximately, one more ml of 2-propanol is added dropwise and the solution is allowed to stand for five minutes. The entire solution is filtered through a 150 mesh stainless steel screen and the residue is separated and dried. If further fractionation is desired, the above process is repeated to generate additional fractions, normally up to 5 or 6, until most of the polymer is precipitated. The insoluble portion and the residues are analyzed by FTIR for composition (ethylene and diene) and compared to the composition of the bulk sample. Similar procedures are described in WO 00/22014 and 00/22015, both of which are incorporated herein by reference.

The random propylene copolymer preferably includes isostatically crystallizable alpha-olefin sequences, e.g., preferably propylene sequences. The crystallinity is, preferably, from about 2 to about 65 percent of homoisotactic polypropylene and preferably from about 5 to about 40 percent, as measured by the heat of fusion of annealed samples of the polymer (DSC).

The random propylene copolymers have a Mooney Viscosity ($ML_{1+4}$@125° C.) of from about 5 to about 35, preferably from about 10 to about 33, and more preferably from about 25 to about 32.

Any metallocene catalyst may be used to synthesize the random propylene copolymers. Metallocenes are generally represented by the formula $Cp_mMR_nX_q$, where Cp is a cyclopentadienyl ring or derivative thereof, M is a group 4, 5, or 6 transition metal, R is a hydrocarbyl group or hydrocarboxy group having from 1 to 20 carbon atoms, X is a halogen or an alkyl group, and m is an integer from about 1 to about 3, n is an integer from 0 to 3, q is an integer from 0 to 3, and the sum of m, n, and q is equal to the oxidation state of the transition metal. The metallocene may be bridged or unbridged, and include hetero atoms in the structure. Examples of particularly preferred metallocenes are discussed in U.S. Pat. Nos. 4,530,914; 4,871,705; 4,937,299; 5,124,418; 5,107,714; 5,120,867; 5,278,119; 5,304,614; 5,324,800; 5,347,025; 5,350,723; 5,391,790; and 5,391,789; EP. Pub. Nos. 591 756; 520 732; and 420 436; and WO Pub. Nos. 91/40257; 93/08221; 93/08199; and 94/01471. Each of these references are incorporated herein by reference. Particularly preferred metallocene components are those that are stereorigid and comprise a group 4, 5, or 6 transition metal. Examples include bis-cyclopentadienyl derivatives, such as bis-indenyl metallocene.

Any curative that is capable of curing or crosslinking the rubber may be used to cure the rubber component. Some non-limiting examples of these curatives include phenolic resins, peroxides, maleimides, and silicon-containing curatives. Depending on the rubber employed, certain curative may be preferred. For example, where elastomeric copolymers containing units deriving from vinyl norbornene are employed, a peroxide curative may be preferred because the required quantity of peroxide will not have a deleterious impact on the engineering properties of the thermoplastic phase of the thermoplastic vulcanizate. In other situations, however, it may be preferred not to employ peroxide curatives because they may, at certain levels, degrade the thermoplastic components of the thermoplastic vulcanizate. Accordingly, some thermoplastic vulcanizates of this invention are cured in the absence of peroxide, or at least in the absence of an amount of peroxide that will have a deleterious impact on the engineering properties of the thermoplastic vulcanizate, which amount will be referred to as a substantial absence of peroxide. In these situations, phenolic resins or silicon-containing curative are preferred.

Any phenolic resin that is capable of crosslinking a rubber polymer can be employed in practicing the present invention. U.S. Pat. Nos. 2,972,600 and 3,287,440 are incorporated herein in this regard. The preferred phenolic resin curatives can be referred to as resole resins and are made by condensation of alkyl substituted phenols or unsubstituted phenols with aldehydes, preferably formaldehydes, in an alkaline medium or by condensation of bi-functional phenoldialcohols. The alkyl substituents of the alkyl substituted phenols typically contain 1 to about 10 carbon atoms. Dimethylol phenols or phenolic resins, substituted in para-positions with alkyl groups containing 1 to about 10 carbon atoms are preferred. These phenolic curatives are typically thermosetting resins and may be referred to as phenolic resin curatives or phenolic resins. These phenolic resins are ideally used in conjunction with a catalyst system. For example, non-halogenated phenol curing resins are preferably used in conjunction with halogen donors and, optionally, a hydrogen halide scavenger. Where the phenolic curing resin is halogenated, a halogen donor is not required but the use of a hydrogen halide scavenger, such as ZnO, is preferred. For a further discussion of phenolic resin curing of thermoplastic vulcanizates, reference can be made to U.S. Pat. No. 4,311,628, which is incorporated herein by reference.

An example of a preferred phenolic resin curative is defined according to the general formula (I).

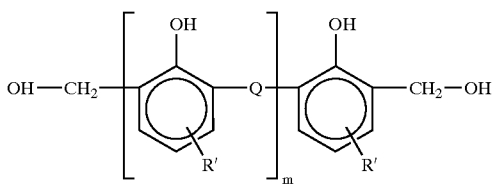

(I)

where Q is a divalent radical selected from the group consisting of —CH$_2$—, —CH$_2$—O—CH$_2$—; m is zero or a positive integer from 1 to 20 and R' is an organic radical. Preferably, Q is the divalent radical —CH$_2$—O—CH$_2$—, m is zero or a positive integer from 1 to 10, and R' is an organic radical having less than 20 carbon atoms. Still more preferably m is zero or a positive integer from 1 to 5 and R' is an organic radical having between 4 and 12 carbon atoms.

Useful silicon-containing curatives generally include silicon hydride compounds having at least two SiH groups. These compounds react with carbon-carbon double bonds of unsaturated polymers in the presence of a hydrosilation catalyst. Silicon hydride compounds that are useful in practicing the present invention include, but are not limited to, methylhydrogen polysiloxanes, methylhydrogen dimethylsiloxane copolymers, alkyl methyl polysiloxanes, bis (dimethylsilyl)alkanes, bis(dimethylsilyl)benzene, and mixtures thereof.

Preferred silicon hydride compounds may be defined by the formula

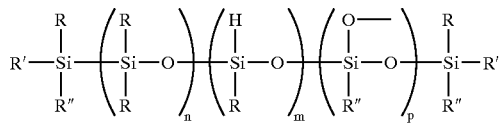

where each R is independently selected from alkyls containing 1 to 20 carbon atoms, cycloalkyls containing 4 to 12 carbon atoms, and aryls, m is an integer having a value ranging from 1 to about 50, n is an integer having a value ranging from 1 to about 50, and p is an integer having a value ranging from 0 to about 6.

As noted above, hydrosilation curing of the elastomeric polymer is preferably conducted in the presence of a catalyst. These catalysts can include, but are not limited to, peroxide catalysts and catalysts including transition metals of Group VIII. These metals include, but are not limited to, palladium, rhodium, and platinum, as well as complexes of these metals. Platinum catalyst are preferred. For a further discussion of the use of hydrosilation to cure thermoplastic vulcanizates, reference can be made to U.S. Pat. No. 5,936, 028, which is incorporated herein by reference. When silicon-containing curatives are employed, the elastomeric copolymer employed will preferably include 5-vinyl-2-norbornene as the diene component.

When used, peroxide curatives are generally selected from organic peroxides. Examples of organic peroxides include, but are not limited to, di-tert-butyl peroxide, dicumyl peroxide, t-butylcumyl peroxide, α,α-bis(tert-butylperoxy) diisopropyl benzene, 2,5 dimethyl 2,5-di(t-butylperoxy)hexane, 1,1-di(t-butylperoxy)-3,3,5-trimethyl cyclohexane, -butyl-4,4-bis(tert-butylperoxy) valerate, benzoyl peroxide, lauroyl peroxide, dilauroyl peroxide, 2,5-dimethyl-2,5-di(tert-butylperoxy) hexene-3, and mixtures thereof. Also, diaryl peroxides, ketone peroxides, peroxydicarbonates, peroxyesters, dialkyl peroxides, hydroperoxides, peroxyketals and mixtures thereof may be used. For a further discussion of peroxide curatives and their use for preparing thermoplastic vulcanizates, reference can be made to U.S. Pat. No. 5,656,693, which is incorporated herein by reference.

Plasticizers, extender oils, synthetic processing oils, or a combination thereof may be employed in the thermoplastic vulcanizates. The extender oils may include, but are not limited to, aromatic, naphthenic, and paraffinic extender oils. The preferred synthetic processing oils are polylinear α-olefins. The compositions of this invention may include organic esters, alkyl ethers, or combinations thereof. U.S. Pat. No. 5,290,886 and 5,397,832 are incorporated herein in this regard. The addition of certain low to medium molecular weight organic esters and alkyl ether esters to the compositions of the invention dramatically lowers the $T_g$ of the polyolefin and rubber components, and of the overall composition, and improves the low temperature properties, particularly flexibility and strength. These organic esters and alkyl ether esters generally have a molecular weight that is generally less than about 10,000. It is believed that the improved effects are achieved by the partitioning of the low $T_g$ ester into both the polyolefin and rubber components of the compositions. Particularly suitable esters include monomeric and oligomeric materials having an average molecular weight below about 2000, and preferably below about 600. The ester should be compatible, or miscible, with both the polyolefin and rubber components of the composition; ie., that it mixes with the other components to form a single phase. The esters found to be most suitable were either aliphatic mono- or diesters or alternatively oligomeric aliphatic esters or alkyl ether esters. Polymeric aliphatic esters and aromatic esters were found to be significantly less effective, and phosphate esters were for the most part ineffective.

In addition to the thermoplastic resins, rubber, curatives and optional extender oils, the compositions of the invention may also include reinforcing and non-reinforcing fillers, antioxidants, stabilizers, rubber processing oil, lubricants, antiblocking agents, anti-static agents, waxes, foaming agents, pigments, flame retardants and other processing aids known in the rubber compounding art. These additives can comprise up to about 50 weight percent of the total composition. Fillers and extenders that can be utilized include conventional inorganics such as calcium carbonate, clays, silica, talc, titanium dioxide, carbon black and the like.

Preferably, compositions of this invention will contain a sufficient amount of the rubber to form rubbery compositions of matter. The skilled artisan will understand that rubbery compositions of matter are those that have ultimate elongations greater than 100 percent, and that quickly retract to 150 percent or less of their original length within about 10 minutes after being stretched to 200 percent of their original length and held at 200 percent of their original length for about 10 minutes.

Accordingly, the thermoplastic vulcanizates of the present invention should comprise at least about 25 percent by weight rubber. More specifically, the thermoplastic vulcanizates include from about 15 to about 95 percent by weight, preferably from about 45 to about 90 percent by weight, and more preferably from about 60 to about 88 percent by weight rubber, based on the total weight of the rubber and thermoplastic component.

The thermoplastic vulcanizates employed in this invention include a thermoplastic component that includes the conventional thermoplastic resin and the random propylene copolymer. Preferably, the thermoplastic vulcanizates include from about 5 to about 85 percent by weight, more preferably from about 10 to about 55 percent by weight, and even more preferably from about 12 to about 40 percent by weight of the thermoplastic component based on the total weight of the rubber and thermoplastic component combined.

The thermoplastic component includes from about 65 to about 90 percent by weight, preferably from about 70 to about 85 percent by weight, and even more preferably from about 75 to about 80 percent by weight conventional thermoplastic resin. Accordingly, the thermoplastic component also includes from about 10 to about 35 percent by weight, preferably from about 15 to about 30 percent by weight, and more preferably from about 20 to about 25 percent by weight random propylene copolymer. It has been surprisingly discovered that the relative amount of conventional thermoplastic resin to random propylene copolymer significantly alters the properties and usefulness of the resulting foam. For example, where the ratio of conventional thermoplastic resin to random propylene copolymer is too high, the resulting foams suffer from high stiffness and high hardness, which translate into high compression load deflection. On the other hand, where the ratio of random propylene copolymer to conventional thermoplastic resin is too high, the resulting foams suffer from poor high temperature performance (e.g., compression set increases) and processability is poor due to high melt viscosity, which ultimately results in poor foamability and poor surface appearance.

The skilled artisan will be able to readily determine a sufficient or effective amount of vulcanizing agent to be employed without undue calculation or experimentation. The amount of vulcanizing agent should be sufficient to at least partially vulcanize the elastomeric polymer. Preferably, the elastomeric polymer is completely vulcanized.

Where a phenolic resin curative is employed, a vulcanizing amount of curative preferably comprises from about 1 to about 20 parts by weight, more preferably from about 3 to about 16 parts by weight, and even more preferably from about 4 to about 12 parts by weight, phenolic resin per 100 parts by weight rubber.

Where a peroxide curative is employed, a vulcanizing amount of curative preferably comprises from about $1 \times 10^{-4}$ moles to about $2 \times 10^{-2}$ moles, more preferably from about $2 \times 10^{-4}$ moles to about $2 \times 10^{-3}$ moles, and even more preferably from about $7 \times 10^{-4}$ moles to about $1.5 \times 10^{-3}$ moles per 100 parts by weight rubber.

Where silicon-containing curative is employed, a vulcanizing amount of curative preferably comprises from 0.1 to about 10 mole equivalents, and preferably from about 0.5 to about 5 mole equivalents, of SiH per carbon-carbon double bond.

Generally, from about 5 to about 300 parts by weight, preferably from about 30 to about 250 parts by weight, and more preferably from about 70 to about 200 parts by weight, of extender oil per 100 parts rubber is added. The quantity of extender oil added depends upon the properties desired, with the upper limit depending upon the compatibility of the particular oil and blend ingredients; this limit is exceeded when excessive exuding of extender oil occurs. The amount of ester plasticizer in the composition will generally be less than about 250 parts, and preferably less than about 175 parts, per 100 parts rubber.

Carbon black may be added in amount from about 40 to about 250, and more preferably from about 40 to about 100 parts by weight per 100 parts by weight of rubber and thermoplastic material combined. The amount of carbon black that can be used depends, at least in part, upon the type of carbon black and the amount of extender oil that is used. The amount of extender oil depends, at least in part, upon the type of rubber. High viscosity rubbers are more highly oil extendable.

The thermoplastic elastomers may be prepared by blending and dynamically vulcanizing, which are techniques that are well known in the art. Advantageously, the thermoplastic elastomers can be prepared in a one-step process whereby the rubber, conventional thermoplastic resin, and random propylene copolymer are blended and the rubber is dynamically vulcanized within the blend in one step. Alternatively, a thermoplastic elastomer containing no random propylene copolymer or only a portion of the random propylene copolymer can first be prepared in one step and the random propylene copolymer can be added to the thermoplastic elastomer in the molten state, ie., the random propylene copolymer can be compounded into the thermoplastic elastomer.

The term dynamic vulcanization refers to a vulcanization or curing process for a rubber contained in a thermoplastic elastomer composition, wherein the rubber is vulcanized under conditions of high shear at a temperature above the melting point of the polyolefin component. The rubber is thus simultaneously crosslinked and dispersed as fine particles within the polyolefin matrix, although other morphologies may also exist. Dynamic vulcanization is effected by mixing the thermoplastic elastomer components at elevated temperature in conventional mixing equipment such as roll mills, Banbury mixers, Brabender mixers, continuous mixers, mixing extruders and the like.

Those ordinarily skilled in the art will appreciate the appropriate quantities, types of cure systems, and vulcanization conditions required to carry out the vulcanization of the rubber. The rubber can be vulcanized by using varying amounts of curative, varying temperatures, and a varying time of cure in order to obtain the optimum crosslinking desired.

The term vulcanized or cured rubber refers to an elastomeric polymer that has undergone at least a partial cure. The degree of cure can be measured by determining the amount of gel, or conversely, the rubber that is extractable from the thermoplastic elastomer by using boiling xylene or cyclohexane as an extractant. This method is disclosed in U.S. Pat. No. 4,311,628. By using this method as a basis, the cured rubber of this invention will have a degree of cure where not more than 35 percent of the rubber is extractable, preferably not more than 15 percent, even more preferably not more than 10 percent, and still more preferably not more than 5 percent of the rubber is extractable. Alternatively, the degree of cure may be expressed in terms of crosslink density. Preferably, the crosslink density is from about 40 to about 160 moles per milliliter of rubber. All of these descriptions are well known in the as and described in U.S. Pat. Nos. 5,100,947 and 5,157,081, which are incorporated herein by reference.

Despite the fact that the rubber component is partially or fully cured, the compositions of this invention can be processed and reprocessed by conventional plastic processing techniques such as extrusion, injection molding, and compression molding. The rubber within the thermoplastic elastomers of this invention is usually in the form of finely-divided and well-dispersed particles of vulcanized or cured rubber, although a co-continuous morphology or a phase inversion is also possible.

The thermoplastic vulcanizates of this invention can be foamed by using conventional foaming procedures, which are well known in the art. In general, these procedures include (i) heating the thermoplastic vulcanizate to a temperature above the melting point of conventional thermoplastic resin, random propylene copolymer, or both, (ii) adding a blowing agent, and (iii) releasing the thermoplastic vulcanizate to atmospheric temperature and pressure. Depending on the type of blowing agent employed, the blowing agent may be added to the thermoplastic vulcanizate prior to heating the thermoplastic vulcanizate in the foaming process, although it is preferred to add the blowing agent to the thermoplastic vulcanizate while it is in its molten state. Also, high pressure is typically required to prevent the foaming agent from prematurely expanding prior to releasing the thermoplastic vulcanizate to atmospheric temperature and pressure. Where a chemical blowing agent is employed, the step of heating should heat the thermoplastic vulcanizate and blowing agent high enough to trigger the chemical decomposition of the blowing agent.

In one embodiment, the thermoplastic vulcanizates of this invention are foamed by using an extruder, such as a single or twin screw extruder. Upon releasing the thermoplastic vulcanizate from the extruder, the extrudate can be shaped, such as by extruding through a shaping die to form a profile. Alternatively, the thermoplastic vulcanizate can be injected into a mold to produce a foamed thermoplastic part.

In one preferred embodiment, the thermoplastic vulcanizate is foamed by using a single screw extruder that includes a two-stage shearing section that includes spaced blisters and a homogenizing section between the blisters, and a homogenizing section downstream of the blisters. By using this extruder, water can be used as a blowing agent to produce technologically useful foam profiles. This extruder and the method for its use are disclosed in U.S. Pat. No. 5,567,370, which is incorporated herein by reference.

The foaming agents may include physical blowing agents, chemical blowing agents, or both. Preferably, the blowing agents should be soluble in the thermoplastic phase of the thermoplastic vulcanizate at the operating conditions of temperature and pressure, i.e., while in the extruder, and phase separate at atmospheric pressure and ambient temperature, or at a temperature and pressure that is lower than the conditions within the extruder.

The physical blowing agents may include water, hydrocarbons such as pentane, propane and butane, fluorocarbons, hydrofluorocarbons, chlorofluorocarbons, hydrochlorofluorocarbons, nitrogen, and super critical fluids such as carbon dioxide.

The physical blowing agents should be used in an amount from about 0.1 to about 10 parts by weight, and preferably from about 0.5 to about 5 parts by weight, based on the total weight of the thermoplastic vulcanizate and the blowing agent mixture.

In one preferred embodiment of this invention, water is used as a blowing agent. In this embodiment, from about 0.1 to about 10 parts by weight water is added per 100 parts by weight of the thermoplastic vulcanizate. In conjunction with the water, detergents, surfactants, or glycols such as ethylene glycol, may be used. This preferred process for foaming the thermoplastic vulcanizates is disclosed in U.S. Pat. No. 5,070,111, which is incorporated herein by reference.

Chemical blowing agents include both exothermic and endothermic blowing agents. Examples of these chemical blowing agents include inorganic foaming agents such as sodium hydrogen carbonate, sodium carbonate, ammonium hydrogen carbonate, ammonium carbonate and ammonium nitrite; nitrous compounds such as N,N'-dimethyl-N,N'-dinitrosoterephthalamide and N,N'-dinitrosopentamethylenetetramine; azo compounds such as azodicarbonamide, azobisisobutyronitrile, azocyclohexylnitrile, azodiaminobenzene and barium azodicarboxylate; sulfonylhydrazide compounds such as benzenesulfonylhydrazide, toluenesulfonylhydrazide, p,p'oxybis(benzenesulfonylhydrazide) and diphenylsulfone-3, 3'-disulfonylhydrazide; and azide compounds such as calcium azide, 4,4'-diphenyldisulfonylazide and p-toluenesulfonylazide. Blends of the foregoing may also be employed such as blends of citric acid and sodium bicarbonate.

The chemical blowing agents should be used in an amount from about 0.5 to about 10 parts by weight, and preferably from about 1 to about 7 parts by weight, based on the total weight of the thermoplastic vulcanizate and the blowing agent mixture combined.

If necessary, a foaming assistant such as a nucleating agent may be added. These nucleating agents are well known to those skilled in the art as disclosed in THERMOPLASTIC FOAMS, by J. L. Throne, Sherwood Publishers, Hinckley, Ohio, 1996, which is incorporated herein by reference.

In order to demonstrate the practice of the present invention, the following examples have been prepared and tested as described in the General Experimentation Section disclosed hereinbelow. The examples should not, however, be viewed as limiting the scope of the invention. The claims will serve to define the invention.

GENERAL EXPERIMENTATION

SAMPLES 1–8

Thermoplastic vulcanizates were prepared by employing conventional ingredients and procedures as are set forth, for example, in U.S. Pat. No. 4,594,390, which is incorporated herein by reference, except that the thermoplastic component may have included a random propylene copolymer as set forth in Table 1. The amounts set forth in Table 1, as well as throughout this specification, are in parts by weight unless otherwise specified.

TABLE I

| Samples | 1 | 2 | 3 | 4 | 5 | 6 | 7 | 8 |
|---|---|---|---|---|---|---|---|---|
| Rubber | 100 | 100 | 100 | 100 | 100 | 100 | 100 | 100 |
| Conventional Plastic | 42 | 32 | 22 | 12 | 0 | 32 | 16 | 8 |
| Random Propylene Copolymer | 0 | 10 | 20 | 30 | 42 | 0 | 16 | 24 |

The rubber was obtained under the tradename Vistalon™ (Exxon Mobil), and the conventional thermoplastic resin was obtained under the tradename D008M™ (Aristech Chemical Corp.).

The random propylene copolymer was prepared by employing a metallocene catalyst. The copolymer was characterized by having a Mooney Viscosity ($ML_{1+4}$@125° C.) of 29 and an ethylene content of about 11%. The following DSC data was collected based upon experiments where the heating rate was 10° C. per/min for heating and cooling: $T_g$=−16.3° C.; $T_m$ (onset)=64.09° C., ΔH=30.01 J/g, and $T_m$ (peak)=83.15° C.; and $T_c$ (onset)=43.21° C., ΔH=30.84 J/g, and $T_c$ (peak)=34.72° C. Similar data was collected where the heating rate was 20° C. per/min for heating ($T_g$ and $T_m$) and 10° C. per/min for cooling ($T_c$): $T_m$ (onset)=57.88° C., ΔH=30.0 J/g, and $T_m$ (peak)=82.05° C.; $T_c$ (onset)=42.13° C., ΔH=34.05 J/g, and $T_c$ (peak)=34.54.

The thermoplastic vulcanizates of Samples 1–8 were analyzed for various physical properties, which are reported in Table II.

TABLE II

| Samples | 1 | 2 | 3 | 4 | 5 | 6 | 7 | 8 |
|---|---|---|---|---|---|---|---|---|
| Shore A Hardness | 66 | 66 | 65 | 55 | 50 | 60 | 52 | 49 |
| Ultimate Tensile Strength (MPa) | 6.9 | 5.8 | 6.56 | 6.1 | 6.3 | 5.6 | 5.57 | 4.69 |
| Elongation at Break (%) | 520 | 403 | 299 | 446 | 494 | 368 | 415 | 369 |
| M100 (MPa) | 2.71 | 2.31 | 3.1 | 1.56 | 1.34 | 2.63 | 1.46 | 1.27 |
| % Weight Gain | 116.7 | 96 | 110.5 | 168 | — | 82.5 | 125 | 150 |
| ACR Viscosity @ 204° C. (Poise) | 353 | 579 | 859 | 1,171 | 1,879 | 310 | 706 | 942 |
| ESR (Ra) | 66 | 56 | 70 | 56 | — | 60 | 109 | 148 |
| Tension Set @ 24° C. (%) | — | 10 | 7.5 | 7.5 | 7.5 | 7.5 | 7.5 | 5 |
| Density | 0.97 | 0.978 | 0.976 | 0.975 | 0.969 | 0.979 | 0.964 | 0.985 |
| Cal Ev. | 152 | 165 | 121 | 95.1 | 143 | 222 | 137 | 132 |

The thermoplastic vulcanizates prepared in Samples 1–8 were foamed into profiles. This was accomplished by using a six-zone, 60 mm diameter, single-screw extruder having a 30:1 L/D. The thermoplastic vulcanizates were fed at a rate of about 15–40 kg per hour in conjunction with from about 90 to about 500 ml of foaming agent per hour, where the foaming agent was injected between zones 4 and 5. At the exit end of the extruder, the extrudate was released through a bulb profile die with a wall thickness of 1 mm. A pressure of at least 2.5 MPa was experienced at the die head, and the foaming agent (water) was injected at about 14–20 MPa. Each temperature zone was set to a temperature between about 160° C. and about 200° C.

The extruded cellular profiles were subjected to physical testing. Specific gravity was determined according to Archimede's method, extrusion surface roughness (Ra) was determined as described above, water absorption was determined according to ASTM D1056, compression set was determined by using a test method similar to ASTM D395-89 after 22 hours at 100° C., and compression load deflection was determined as follows. A 100 mm sample is uniformly compressed to 40% of its height at room temperature for three times and the third force measurement is reported as the compression load deflection. The results of this physical testing are provided in Table III.

TABLE III

| Samples | 1 | 2 | 3 | 4 | 5 | 6 | 7 | 8 |
|---|---|---|---|---|---|---|---|---|
| Foam Specific Gravity (1.1 wt % H$_2$O) | — | 0.48 | 0.55 | 0.62 | 0.7 | 0.77 | 0.6 | 0.8 |
| Foam Specific Gravity (1.4 wt % H$_2$O) | 0.45 | 0.4 | 0.52 | 0.72 | 0.7 | 0.82 | 0.65 | 0.77 |
| ESR (Ra) in $\mu$m | 9.1 | 8.5 | 7.8 | — | — | 11.1 | 11.1 | — |
| Water Absorption Atmospheric (wt %) | — | 6.1 | 4.7 | — | — | — | 3.0 | — |
| Water Absorption Vacuum (wt %) | — | 31.4 | 22.7 | — | — | — | 3.96 | — |
| Compression Set 22 hrs @ 100° C. (%) & 40% compression | 52 | 38.6 | 37.4 | — | — | — | 31.7 | — |
| Compression Load Deflection (Kgf/100 mm) | 0.77 | 0.44 | 0.7 | — | — | — | 0.73 | — |

SAMPLES 9–11

By employing procedures similar to those set forth in Samples 1–8, three additional thermoplastic vulcanizates were prepared and the amount of random propylene copolymer employed is set forth in Table IV.

TABLE IV

| Samples | 9 | 10 | 11 |
|---|---|---|---|
| Rubber | 100 | 100 | 100 |
| Conventional Plastic | 16 | 24 | 8 |

TABLE IV-continued

| Samples | 9 | 10 | 11 |
|---|---|---|---|
| Random Propylene Copolymer | 16 | 8 | 24 |

The random propylene copolymer was prepared by employing a metallocene catalyst. The copolymer was characterized by having a Mooney Viscosity (ML$_{1+4}$@125° C.) of 29 and an ethylene content of about 11%. The following DSC data was collected based upon experiments where the heating rate was 10° C. per/min for heating and cooling: T$_g$=−22.61° C.; T$_m$ (onset)=41.51° C., ΔH=36.76 J/g, and T$_m$ (peak)=52.87° C.; and T$_c$ (onset)=38.06° C., ΔH=20.05 J/g, and T$_c$ (peak)=19.22° C.

The thermoplastic vulcanizates of Samples 9–11 were analyzed for various physical properties, which are reported in Table V.

TABLE V

| Samples | 9 | 10 | 11 |
|---|---|---|---|
| Shore A Hardness | 52 | 56 | 45 |
| Ultimate Tensile Strength (MPa) | 4.88 | 5.2 | 4.34 |
| Elongation at Break (%) | 406 | 397 | 397 |
| % Weight Gain | 144 | 122 | 181 |
| ESR (Ra) | 91 | 133 | 101 |
| Tension Set @ 24° C. (%) | 10 | 10 | 10 |
| Specific Gravity | 0.975 | 0.949 | 0.956 |

In a similar fashion to Samples 1–8, the thermoplastic vulcanizates of Samples 9–11 were foamed into profiles and the profiles were subjected to physical testing, which is reported in Table VI. The test methods were the same as Samples 1–8 except that the water absorbsion tests were modified by employing a twelve inch sample that was cut into a U shape and only a portion of the sample was submerged in water.

TABLE VI

| Samples | 9 | | 10 | | 11 | |
|---|---|---|---|---|---|---|
| % Water in Foaming | 1.7 | 1.3 | 1.7 | 1.3 | 1.7 | 1.3 |
| Specific Gravity | 0.54 | 0.56 | 0.45 | 0.49 | 0.69 | X |
| ESR (Ra) | 7.3 | 8 | 7.2 | 6.4 | 8.1 | X |
| Water Absorption Atmospheric (wt %) | 3.1 | 2.8 | 5.2 | 4.6 | 2.7 | X |
| Water Absorption Vacuum (wt %) | 0.5 | 0.8 | 0.6 | 0.9 | 0.5 | X |
| Compression Set % @ 40% compression | | | | | | |
| 22 hrs @ 100° C. | 26 | 30 | 31 | 33 | 32 | X |
| 22 hrs @ 70° C. | 25 | 26 | 25 | 28 | 26 | X |
| 72 hrs @ 100° C. | 36 | 39 | 40 | 40 | 37 | X |
| 72 hrs @ 70° C. | 27 | 31 | 34 | 34 | 32 | X |
| Compression Load Deflection (Kgf/100 mm) | 0.83 | 1.2 | 0.66 | 0.77 | 1 | X |

While the best mode and preferred embodiment of the invention have been set forth in accord with the Patent Statues, the scope of this invention is not limited thereto, but rather is defined by the attached claims. Thus, the scope of the invention includes all modifications and variations that may fall within the scope of the claims.

What is claimed is:

1. A foam profile prepared by a process comprising the steps of:
    foaming a thermoplastic vulcanizate, where the thermoplastic vulcanizate is prepared by a process comprising the step of dynamically vulcanizing a rubber within a mixture that includes from about 15 to about 95 percent by weight of the rubber and from about 5 to about 85 percent by weight of a thermoplastic component based upon the total weight the rubber and thermoplastic component combined, where the thermoplastic component includes from about 65 to about 90 percent by weight of a conventional thermoplastic resin and from about 10 to about 35 percent by weight of a random propylene copolymer based upon the total weight of the thermoplastic component.

2. The foam profile of claim 1, where the thermoplastic component includes from about 70 to about 85 percent by weight conventional thermoplastic resin and from about 15 to about 30 percent by weight random propylene copolymer.

3. The foam profile of claim 2, where the thermoplastic component includes from about 75 to about 80 percent by weight conventional thermoplastic resin and from about 20 to about 25 percent by weight random propylene copolymer.

4. A foam profile prepared by a process comprising the steps of:
    foaming a thermoplastic vulcanizate, where the thermoplastic vulcanizate comprises vulcanized rubber and from about 5 to about 85 percent by weight of a thermoplastic component based upon the total weight of the rubber and thermoplastic component combined, and where the thermoplastic component comprises from about 65 to about 90 percent by weight of a conventional thermoplastic resin and from about 10 to about 35 percent by weight of a random propylene copolymer based upon the total weight of the thermoplastic component.

5. The foam profile of claim 4, where the thermoplastic component includes from about 70 to about 85 percent by weight conventional thermoplastic resin and from about 15 to about 30 percent by weight random propylene copolymer.

6. The foam profile of claim 5, where the thermoplastic component includes from about 75 to about 80 percent by weight conventional thermoplastic resin and from about 20 to about 25 percent by weight random propylene copolymer.

7. The foam profile of claim 4, where the random propylene copolymer includes units that derive from comonomer that includes ethylene, α-olefins having from 4 to about 20 carbon atoms, or both.

8. The foam profile of claim 7, where the random copolymer includes from about 78 to about 93 percent by weight units deriving from propylene and from about 7 to about 22 percent by weight units deriving from the comonomer.

9. The foam profile of claim 4, where the random propylene copolymer has a weight average molecular weight of from about 5,000 to about 1,000,000.

10. The foam profile of claim 4, where the random propylene copolymer has a weight average molecular weight of from about 100,000 to about 900,000.

11. The foam profile of claim 4, where the random propylene copolymer has a melt temperature from about 200 to about 100° C.

12. The foam profile of claim 4, where the random propylene copolymer has a glass transition temperature of about −40° C. to about −50° C.

13. The foam profile of claim 4, where the random propylene copolymer has a Mooney Viscosity ($ML_{1+4}$@125° C.) of about 5 to about 35.

14. The foam profile of claim 4, where the random propylene copolymer has a crystallinity that is from about 2 to about 65 percent of homoisotactic polypropylene.

15. The foam profile of claim 4, where the random propylene copolymer is prepared by using a metallocene catalyst.

16. The foam profile of claim 4, where said step of foaming includes heating the thermoplastic vulcanizate to a temperature above the melting point of the conventional thermoplastic resin, the random propylene copolymer, or both, adding a blowing agent, and releasing the thermoplastic vulcanizate to atmospheric temperature and pressure.

17. The foam profile of claim 16, where said step of foaming employs water as a blowing agent.

18. A foam profile comprising:
    a foamed thermoplastic vulcanizate, where the thermoplastic vulcanizate comprises vulcanized rubber and from about 5 to about 85 percent by weight of a thermoplastic component based upon the total weight of the rubber and thermoplastic component combined, and where the thermoplastic component comprises from about 65 to about 90 percent by weight of a conventional thermoplastic resin and from about 10 to about 35 percent by weight of a random propylene copolymer based upon the total weight of the thermoplastic component.

19. The foam profile of claim 18, where the thermoplastic component includes from about 70 to about 85 percent by weight conventional thermoplastic resin and from about 15 to about 30 percent by weight random propylene copolymer.

20. The foam profile of claim 18, where the thermoplastic component includes from about 75 to about 80 percent by weight conventional thermoplastic resin and from about 20 to about 25 percent by weight random propylene copolymer.

* * * * *